(12) United States Patent
Reid (10) Patent No.: US 7,434,222 B2
(45) Date of Patent: Oct. 7, 2008

(54) TASK CONTEXT SWITCHING RTOS

(75) Inventor: Robert Alan Reid, Superior, CO (US)

(73) Assignee: Infineon Technologies AG, Munich (DE)

( * ) Notice: Subject to any disclaimer, the term of this patent is extended or adjusted under 35 U.S.C. 154(b) by 816 days.

(21) Appl. No.: 10/028,899

(22) Filed: Dec. 20, 2001

(65) Prior Publication Data
US 2003/0120712 A1 Jun. 26, 2003

(51) Int. Cl.
*G06F 9/46* (2006.01)
(52) U.S. Cl. .................................. 718/107; 718/108
(58) Field of Classification Search .......... 718/107–108
See application file for complete search history.

(56) References Cited

U.S. PATENT DOCUMENTS

| 4,847,751 A | * | 7/1989 | Nakade et al. ............... 718/107 |
| 4,851,992 A | * | 7/1989 | Nakayama .................... 718/108 |
| 5,630,130 A | * | 5/1997 | Perotto et al. ................ 718/107 |
| 5,655,132 A | * | 8/1997 | Watson ........................ 718/104 |
| 6,128,641 A | * | 10/2000 | Fleck et al. .................. 718/108 |
| 6,145,049 A | * | 11/2000 | Wong ........................... 710/267 |
| 6,671,762 B1 | * | 12/2003 | Soni et al. .................... 710/267 |

FOREIGN PATENT DOCUMENTS

| JP | 02163834 A | * | 6/1990 |
| JP | 05233329 A | * | 9/1993 |

\* cited by examiner

*Primary Examiner*—Meng-Ai An
*Assistant Examiner*—Qing-Yuan Wu
(74) *Attorney, Agent, or Firm*—Staas & Halsey LLP

(57) ABSTRACT

A task switch from a first data processing task to a second data processing task can be accomplished by the first task calling a function which saves the first task's context, restores the second task's context and then returns. Because the second task's context has been restored, the called function actually returns to the second task, thereby completing the task switch.

19 Claims, 5 Drawing Sheets

| TASK | CPSA | CPSA CONTENTS | CPSA POINTER VALUE | CSA CHAIN |
|---|---|---|---|---|
| MAIN | CPSA 0 | LCX0, FCX0, PCX0 | 0 | CHAIN 0 |
| TASK 1 | CPSA 1 | LCX1, FCX1, PCX1 | 1 | CHAIN 1 |
| TASK 2 | CPSA 2 | LCX2, FCX2, PCX2 | 2 | CHAIN 2 |
| TASK 3 | CPSA 3 | LCX3, FCX3, PCX3 | 3 | CHAIN 3 |
| ⋮ | ⋮ | ⋮ | ⋮ | ⋮ |
| TASK n | CPSA n | LCXn, FCXn, PCXn | n | CHAIN n |

FIG. 7

71 — ALLOCATE MEMORY FOR CSAs AND CPSAs
72 — CREATE CSA CHAINS
73 — INITIALIZE CONTENTS OF CSAs AND CPSAs
74 — INITIALIZE CONTEXT POINTER REGISTERS
75 — INITIALIZE CPSA POINTER
76 — JUMP TO MAIN

FIG. 8

81 — SAVE LOWER CONTEXT OF CALLING TASK
82 — DISABLE INTERRUPTS
83 — SAVE CALLING TASK'S CONTEXT POINTERS IN CPSA IDENTIFIED BY CURRENT CPSA POINTER VALUE
84 — UPDATE CPSA POINTER VALUE
85 — LOAD NEXT TASK'S CONTEXT POINTERS FROM CPSA IDENTIFIED BY CURRENT CPSA POINTER VALUE
86 — ENABLE INTERRUPTS
87 — RESTORE LOWER CONTEXT OF NEXT TASK
88 — RETURN TO NEXT TASK

TASK CONTEXT SWITCHING RTOS

FIELD OF THE INVENTION

The invention relates generally to embedded control systems and, more particularly, to task switching in embedded control systems.

BACKGROUND OF THE INVENTION

Most embedded and real-time control systems are designed according to a model in which interrupt handlers and software-managed tasks are each considered to be executing on their own "virtual" microcontroller. That model is generally supported by the services of a Real-Time Executive or Real-Time Operating System (RTOS), layered on top of the features and capabilities of the underlying machine architecture. The RTOS typically controls several concurrent operations. For example, the following operations can be controlled concurrently in a DVD optical drive: receiving and processing commands from a host computer; managing the flow of data to/from the media; positioning the pickup over the media (seeking); and managing the correction of data (error correction coding).

In an embedded environment, the processor is frequently "paused" while waiting for some hardware or software process to happen, such as waiting for a seek to finish or for a data block to be transferred. While the processor is paused with respect to a given task, it is desirable for the processor to switch to another task and attempt to advance that process, thereby gaining enhanced performance by performing more than one task in parallel.

In one example of DVD optical drive control, there are three switched firmware tasks, namely a host task, a disk task and a high level servo task, and one interrupt-driven task, namely a low level servo task. The disk task may want to start a seek operation and, while the seek operation is ongoing, the disk task can continue to process buffered data. The disk task can build a high level servo task command block with the desired seek location, and then release the processor so that it can switch to the high level servo task. When the high level servo task is activated and sees the new seek command, the high level servo task performs its required work, namely determining current and target locations and calculating the required track crossings for the low level servo to move the pickup. As soon as the high level servo task has set up the seek, it has nothing else to do until the low level servo task has completed the movement. Therefore, the high level servo task can release the processor so the processor can switch to another task (i.e. the disk task or the host task). Thus, in this example, the disk task is active concurrently with the seek operation. From time to time, the disk task can switch back to the high level servo task to see if the low level servo task has completed the seek operation. If it has not, the high level servo task can switch back to the disk task. This switching back and forth between the disk task and the high level servo task is completed relatively fast, so completion of the seek operation can still be recognized with good resolution, resulting in a negligible impact on the performance of the disk task.

Another example is when the disk task is performing an audio play operation (audio data from the media to the data buffer, audio data from the buffer to the digital-to-analog converter, and then to the headphone jack). During this audio play operation, the disk task can release the processor so it can switch to the host task, which can perform desired processing concurrently with the audio play operation and without interrupting the audio play operation.

There are various conventional approaches to task switching, including: operating systems based solely on interrupts; a task switching RTOS using a firmware-maintained stack (or multiple stacks) to save the context of each firmware task; a complex RTOS based on time-slice protocols (or other methods); and various task managers or state machines that can switch from one task to another. These aforementioned conventional approaches tend to be relatively complex, requiring undesirably large amounts of code space and execution time. These are critical factors for embedded software.

It is therefore desirable to provide for task switching that is less complex, and requires less code space and execution time than the conventional approaches.

According to the invention, a task switch from a first task to a second task can be accomplished by the first task calling a function which saves the first task's context, restores the second task's context, and then returns. Because the second task's context has been restored, the called function actually returns to the second task, thereby completing the task switch. This approach is advantageously simpler than the prior art approaches, and further advantageously requires less code space and less execution time than the prior art approaches.

DETAILED DESCRIPTION

Exemplary embodiments of the present invention exploit a conventionally available context switching mechanism to provide for task switching that is simpler, faster and requires less memory than conventional approaches. In addition to the obvious benefits of faster operation and lower memory requirements, the fact that the task switching mechanism according to the invention is simpler than conventional approaches enables a user more easily to support, maintain and debug the task switching mechanism.

In the realm of embedded and Real-Time control systems, a task can be considered to be an independent thread of control. A task's context defines the state of that task. If the task is interrupted, its context is saved and later restored when the task is restarted.

In one conventionally available data processor architecture, the TriCore architecture of Infineon Technologies, the context of a task is subdivided into an upper context and a lower context. The upper context includes certain predetermined address registers designated as upper address registers and certain predetermined data registers designated as upper data registers. These upper address registers and upper data registers are designated as non-volatile for purposes of function calling. Similarly, the lower context includes certain address registers designated as lower address registers, and certain data registers designated as lower data registers, plus the program counter (PC).

Both the upper and lower contexts, when saved to memory, occupy 16-word blocks of storage referred to as context save areas (CSAs). The first word in a CSA is a link word which links that CSA to the next CSA in a chain (i.e., a linked list) of CSAs.

The TriCore architecture can switch contexts when a function call occurs. The upper context is saved automatically during performance of a function call, and the lower context can thereafter be saved explicitly by execution of an instruction that saves the lower context.

Figure 1:
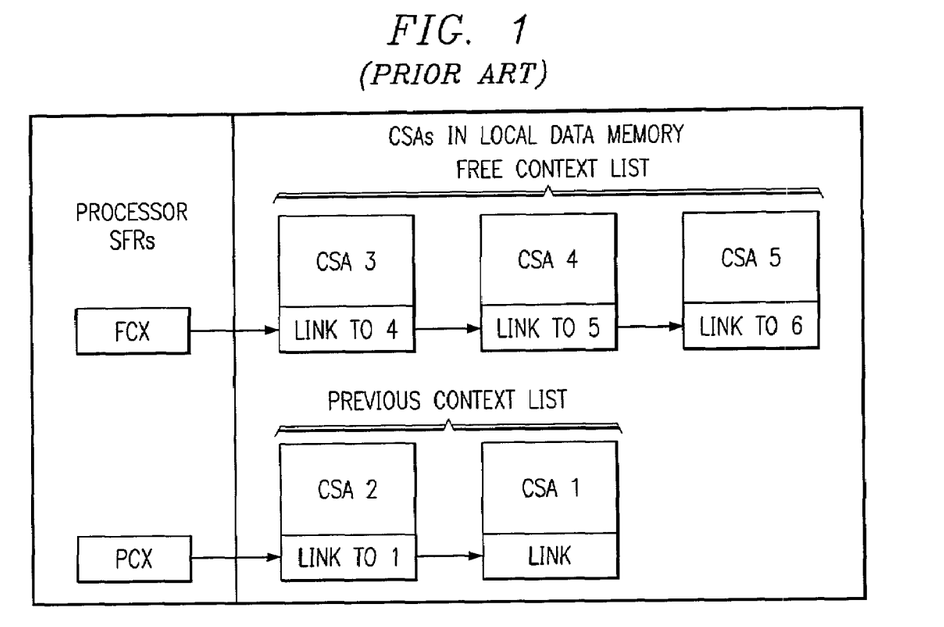
FIGS. 1-3 diagrammatically illustrate operations in a conventional context save process.

As mentioned above, during a context save operation, the upper and lower contexts can be saved into CSAs. Unused CSAs are linked together in a portion of the CSA chain referred to as the free context list. CSAs that contain saved upper and/or lower contexts are linked together in another portion of the CSA chain referred to as the previous context list. FIG. 1 illustrates an exemplary configuration of a CSA chain for a given task, including both a free context list and a previous context list.

In the TriCore context switching mechanism, any given task has a set of corresponding context pointers. The context pointers of a given task are used to identify and manage a CSA chain which has been assigned to that task for purposes of saving and restoring that task's context.

When saving or restoring the context of a given task, the context pointers for that task are held in context pointer registers designated herein as FCX, PCX and LCX. The FCX register holds a pointer which points to a first available CSA in the free context list. The link word of that first available CSA points, in turn, to the next available CSA in the free context list. Before an upper or lower context is saved in the first available CSA, the link word of the first available CSA is read, thereby supplying a new value for the FCX register. (Thus, to the memory subsystem, context saving is a read/modify/write operation.) The new value of FCX, which points to the next available CSA, is available immediately for subsequent upper or lower context saves.

The PCX register holds a pointer which points to a CSA where the previous context was saved. The LCX register (not explicitly shown in FIG. 1) points to one of the last CSAs in the free context list. If, after a context save operation, the new value of FCX matches the pointer value in the LCX register, this indicates that the CSA chain is almost completely full. If this condition is detected, the processor can, for example, divert processor control to a suitable trap handler.

When a CALL instruction is executed, the context of the calling routine is saved in an associated CSA chain. The return address (typically the address of the instruction immediately following the CALL instruction) is part of the upper context information saved in the CSA. In the TriCore architecture, the saving of the upper context is integrated with the CALL instruction, so the save operation for the upper context is performed by hardware in parallel with the call jump. (The lower context can also be saved by executing a lower context save instruction supported by the TriCore architecture.) The restoring of the upper context is integrated with the return instruction RET, and happens in parallel with the return jump. (The lower context can also be restored by executing a lower context restore instruction supported by the TriCore architecture.)

Returning again to the example of FIG. 1, the free context list includes three free CSAs (CSA3, CSA4 and CSA5), and the previous context list includes two CSAs (CSA2 and CSA1). The FCX register points to CSA3, the first available CSA in the free context list. The link word of CSA3 points to CSA4, and the link word of CSA4 points to CSA5. The PCX register points to the CSA (CSA2) in which context was most recently saved. The link word of CSA2 points to CSA1, which contains the context that was saved prior to the context saved in CSA2.

Figure 2:
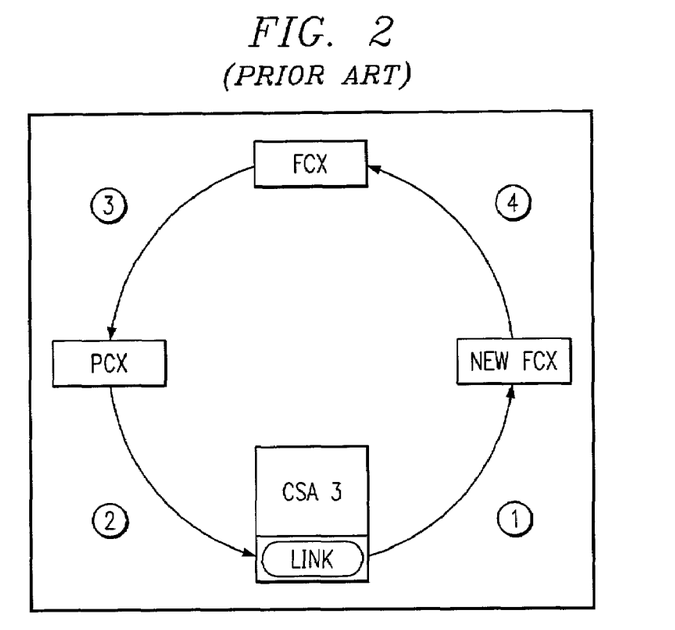

When a context save operation is performed, the first CSA in the free context list (CSA3 in the example of FIG. 1) is pulled out of the free context list and is placed on the front of the previous context list. FIG. 2 illustrates the steps taken during a context save operation. The numbers circled in FIG. 2 illustrate the operations described in the correspondingly numbered steps below, which steps are executed in the numerical order shown.

1. The contents of the link word in CSA3 are loaded into a "new FCX" register. Note that the "new FCX" register is an internal buffer and is not accessible by the user. The "new FCX" register now points to CSA4.

2. The contents of the PCX register are written into the link word of CSA3. The link word of CSA3 now points to CSA2.

3. The contents of the FCX register are written into the PCX register. The PCX register now points to CSA3, thereby placing CSA3 at the front of the previous context list.

4. The contents of the "new FCX" register are loaded into the FCX register.

Figure 3:
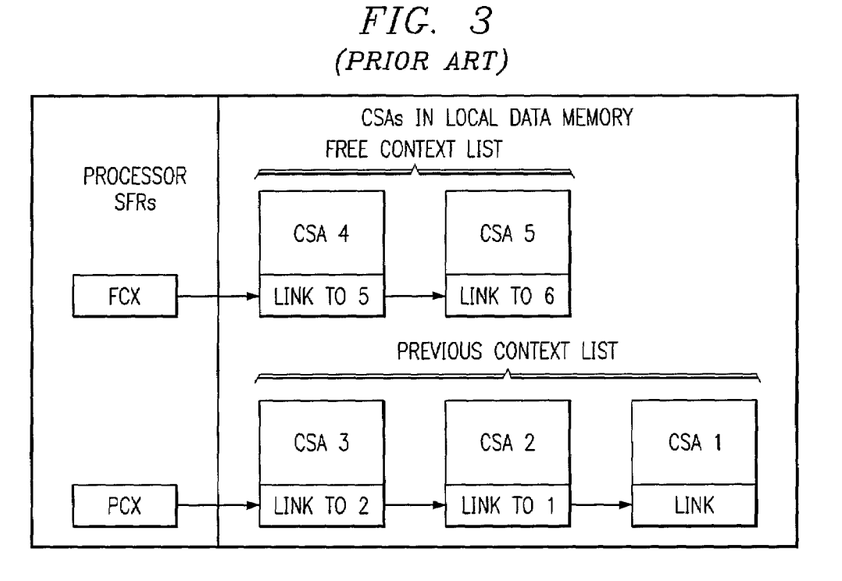

After the steps described above and illustrated in FIG. 2, the CSA chain is configured as shown in FIG. 3. With the CSA chain now appropriately configured, the context that is to be saved can now be written into the remainder (i.e., other than the link word) of CSA3.

In FIG. 3, the previous context list includes CSA3, CSA2 and CSA1, and the free context list includes CSA4 and CSA5. The FCX register points to CSA4, the first available CSA in the free context list. The PCX register points to CSA3, which is the CSA to which the most recent context save was directed. The link word of CSA3 points to CSA2, the link word of CSA2 points to CSA1, and the link word of CSA4 points to CSA5.

Figure 4:
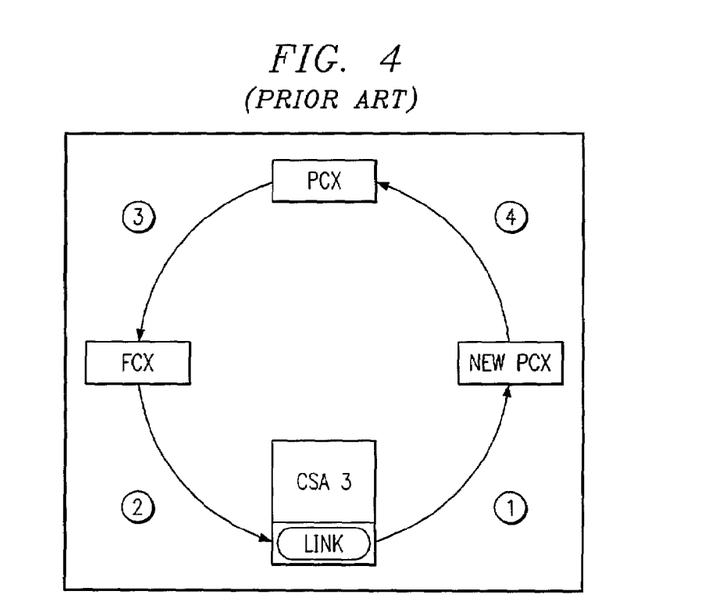
FIG. 4, together with FIGS. 1 and 3, diagrammatically illustrates operations in a conventional context restore process.

Still referring to FIG. 3, when a context restore operation is performed, the first CSA in the previous context list (CSA3 in this example) is pulled from the previous context list and placed on the front of the free context list. FIG. 4 illustrates the steps taken during a context restore operation. The circled numbers in FIG. 4 designate the operations described in the correspondingly numbered steps set forth below, which steps are executed in the numerical order shown.

1. The contents of the link word in CSA3 are loaded into a "new PCX" register. The "new PCX" register, similarly to the above-described "new FCX" register, is an internal buffer that is not accessible by the user. The "new PCX" register will now point to CSA2.

2. The contents of the FCX register are written into the link word of CSA3. The link word of CSA3 now points to CSA4.

3. The contents of the old PCX register are written into the FCX register. The FCX register now points to CSA3, which is at the front of the free context list.

4. The contents of the "new PCX" register are loaded into the PCX register.

The operations described with respect to FIG. 4, when applied to the CSA chain configuration of FIG. 3, result in the CSA chain configuration of FIG. 1. After achieving the CSA chain configuration illustrated in FIG. 1, the context can be written (restored) from CSA3 to the context (upper or lower) registers.

According to exemplary embodiments of the present invention, the conventional context switching mechanism described above with respect to FIGS. 1-4 is exploited to produce a task switching mechanism that is simpler, requires less memory, and is faster than the prior art task switching mechanisms. In particular, if a first task invokes a call function by executing a CALL instruction, then its context is stored as described above with respect to FIGS. 1-3. If the called function appropriately adjusts the context pointer registers FCX, LCX and PCX such that these registers identify the CSA chain of a second task other than the calling task, then, when the called function returns (by execution of a RET instruction), the context restore operation (see FIGS. 1, 3 and 4) performed in conjunction with the RET instruction will cause the context of the second task (including the second task's return address) to be loaded into the context registers. The TriCore RET instruction also forwards the return address from its context register to the program counter (PC) register, so the called function actually returns to the second task rather than the first task which called it. (In some embodiments, the PC register itself is one of the context registers.) Thus, a switch from the first task to the second task can be accomplished by calling a function which suitably adjusts the contents of the context pointer registers and then returns.

Figures 5A, 5B:
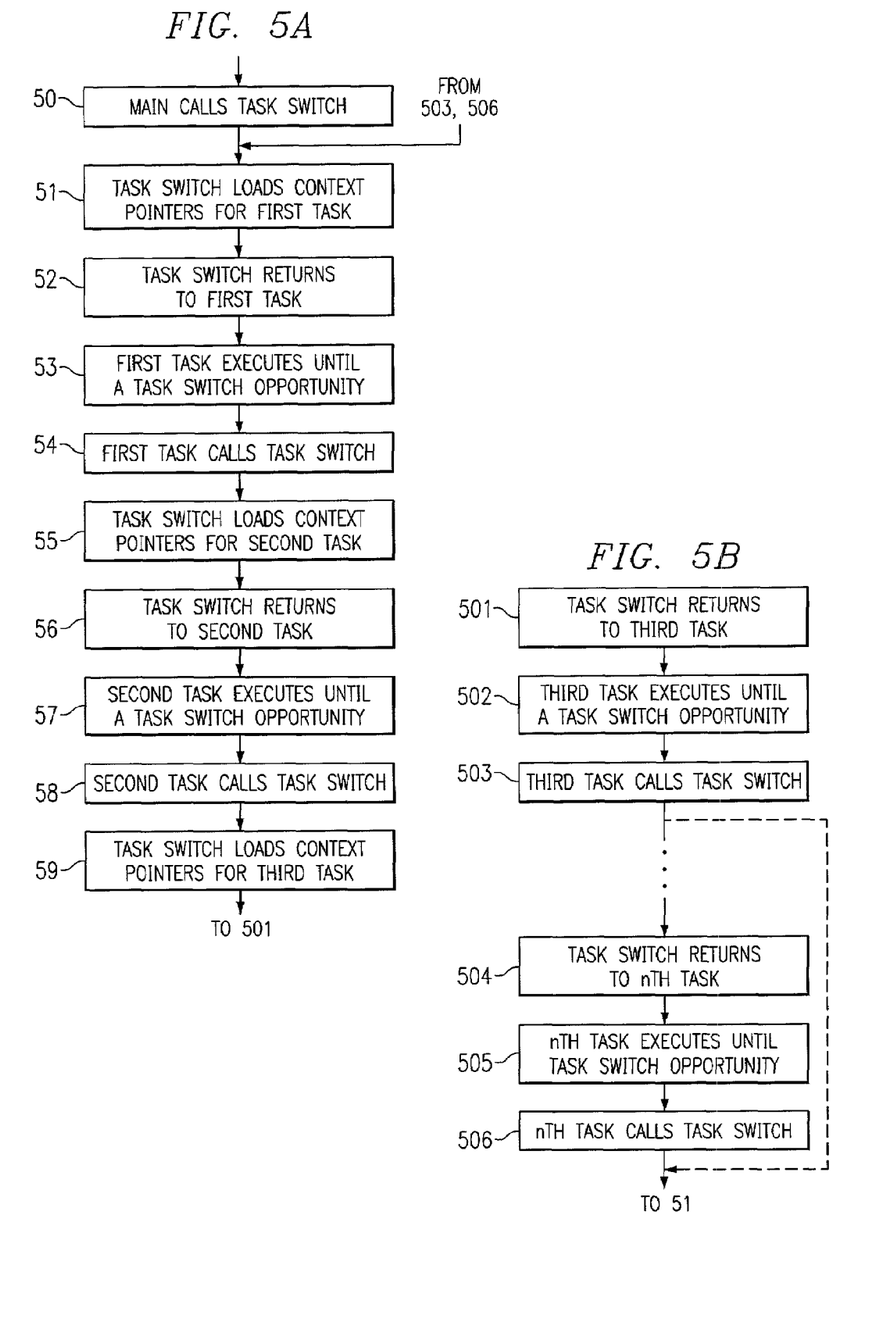
FIGS. 5A and 5B illustrate exemplary task switching operations according to the invention.

FIGS. 5A and 5B illustrate exemplary operations according to the invention. At 50, a main program calls a task switch function. At 51, the task switch function loads the context pointers for a first task, and at 52 the task switch function returns to the first task. At 53, the first task executes until a task switch opportunity (such as one of those described above) occurs. When the task switch opportunity occurs, the first task calls the task switch function at 54. This calling operation stores the context of the first task. At 55, the task switch function loads the context pointers for a second task, and at 56 the task switch function returns to the second task.

At 57, the second task executes until a task switch opportunity occurs. When a task switch opportunity occurs, the second task calls the task switch function at 58, thereby causing the context of the second task to be stored. At 59, the task switch function loads the context pointers for a third task, and at 501 the task switch function returns to the third task. At 502, the third task executes until a task switch opportunity occurs, whereupon the third task calls the task switch function at 503. The task switching operations can continue for as many tasks as desired. At 504, the task switch returns to an nth task, and the nth task executes at 505 until a task switch opportunity occurs. When the task switch opportunity occurs, the nth task calls the task switch function at 506. Thereafter, the task switch function loads the context pointers for the first task at 51, and the illustrated operations can be repeated as shown.

FIGS. 5A and 5B illustrate task switching among n tasks and also illustrate (by broken line in FIG. 5B) task switching among three tasks. It should also be noted that the main program is merely provided as a mechanism for switching initially to the first task.

Figure 6:
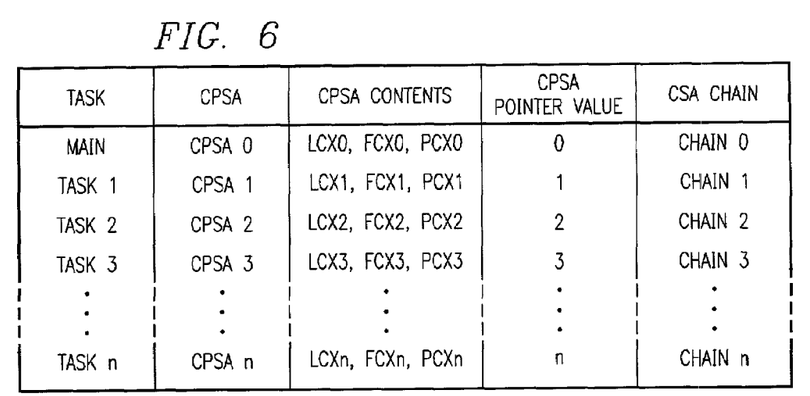
FIG. 6 illustrates in tabular format an exemplary memory arrangement that supports task switching according to the invention.

FIG. 6 illustrates in tabular format a memory arrangement which permits the task switch function to, for example, load the context pointers for a second task at 55 after having been called by a first task at 54 (see also FIG. 5A). As shown in FIG. 6, each task has an associated CSA chain for storing its context. Each task also has a context pointer storage area (CPSA) where the context pointers for that task are stored.

For example, the context of task 1 is stored in CSA chain 1 and the context pointers of task 1 are stored in CPSA1. The CPSA associated with each task has stored therein the context pointers which are used to identify and maintain the CSA chain of that task. For example, the context pointer values LCX2, FCX2 and PCX2 are stored in CPSA2. When a context save or context restore operation is being performed with respect to the context of task 2, the pointer values LCX2, FCX2 and PCX2 are respectively loaded into the context pointer registers LCX, FCX and PCX. These context pointer values, as loaded into the context pointer registers, are used to identify and maintain CSA chain 2 for either saving or restoring the task 2 context.

FIG. 6 also illustrates a CPSA pointer which points to one of the CPSAs of FIG. 6. For example, a CPSA pointer value of 1 points to CPSA1, a CPSA pointer value of 2 points to CPSA2, etc. The CPSA pointer value thus determines which of the CPSAs is to be used for either saving the current contents of the context pointer registers or for providing context pointer values to be loaded into the context pointer registers.

Thus, for example, when task 1 calls the task switch function, the task switch function can set the CPSA pointer value equal to (for example) 3, and load the context pointer registers LCX, FCX and PCX with the context pointer values that are stored in CPSA3, namely the context pointer values LCX3, FCX3 and PCX3 associated with task 3.

Then, when the task switch function returns, the context of task 3 will be restored and task 3 will begin to execute.

Figure 7:
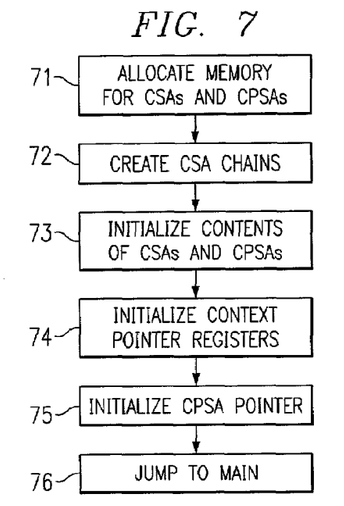
FIG. 7 illustrates exemplary initialization operations to allocate and initialize the memory portions illustrated in FIG. 6.

FIG. 7 illustrates exemplary operations which can be performed in order to initialize a data processor to perform the operations of FIGS. 5A and 5B. At 71, memory is allocated for the CSAs and CPSAs. At 72, the CSA chains are created. At 73, the contents of the CSAs and CPSAs are initialized. At 74, the context pointer registers are initialized to contain, for example, the context pointer values LCX0, FCX0 and PCX0 associated with the main program (see also FIG. 6). This ensures that, when the main program initially calls the task switch function at 50 in FIG. 5A, the context of the main program, which context is irrelevant to the desired task switching operations, will be saved in a known area of CSA memory, namely CSA chain 0. At 75 the CPSA pointer is initialized. At 76, a jump to the main program is executed, whereupon the operation at 50 in FIG. 5A begins. Although not explicitly shown in FIG. 7, memory can be allocated such that each task has its own separate stack. In such embodiments, the context of each task can include the stack pointer.

Figure 8:
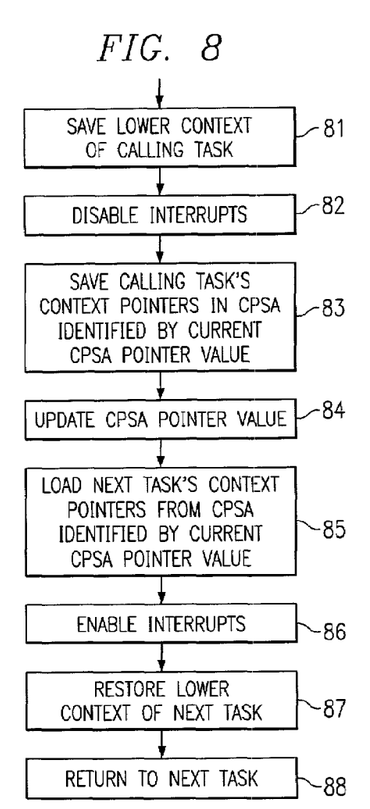
FIG. 8 illustrates exemplary operations of a task switch function according to the invention.

FIG. 8 illustrates exemplary operations which can be performed by a task switch function according to the invention. These operations can be performed, for example, when the main program calls the task switch function at 50 in FIG. 5A, and whenever any of the other tasks in FIGS. 5A and 5B call the task switch function. At 81, the lower context of the calling task is saved, the upper context of the calling task having already been saved in parallel with execution of the CALL instruction. Interrupts are disabled at 82. At 83, the calling task's context pointers are saved in the CPSA identified by the current CPSA pointer value. The CPSA pointer value is updated at 84. At 85, the next task's context pointers are loaded from the CPSA identified by the current (i.e., updated) CPSA pointer value. Interrupts are enabled at 86. The lower context of the next task is restored at 87. The task switch function then returns to the next task at 88, the upper context of the next task being restored in parallel with execution of the RET instruction.

Figure 9:
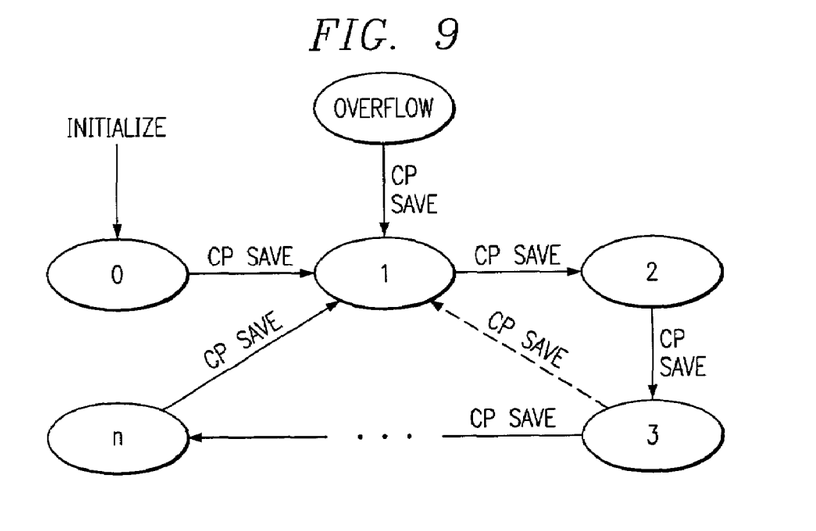
FIG. 9 is a state diagram which illustrates exemplary sequencing of the CPSA pointer of FIGS. 6-8.

FIG. 9 illustrates a state diagram of an exemplary state machine which can control the CPSA pointer value of FIGS.

6-8. In the example of FIG. 9, the CPSA pointer value is initialized to 0 and is incremented (corresponding to the update step at 84 in FIG. 8) each time a calling task's context pointers (CP in FIG. 9) are saved (see 83 in FIG. 8). Referring also to FIG. 6, it can be seen that FIG. 9 illustrates an example wherein the task switch function is first called by the main program and returns to task 1, is thereafter called by task 1 and returns to task 2, is later called by task 2 and returns to task 3, and so on until the task switch function is called by task n and returns to task 1. Also shown by broken line in FIG. 9 is an example wherein task switching applies to only three tasks. Although FIG. 9 illustrates a round-robin task switching pattern, it should be clear that the invention supports any type of task switching pattern. For example, in some task switching patterns, some tasks may be switched to more or less often than are other tasks.

It should also be noted that the CSA chain of each task can be initialized (in FIG. 7) such that the return address is the start of that task. Thus, for each task, the first time that the task switch function returns to the task, the task will begin execution at its start. Thus, the first time that the task switch function returns to the various tasks at 52, 56, 501 and 504 in FIGS. 5A and 5B, each of the tasks that is returned to will begin execution at its start.

Figure 10:
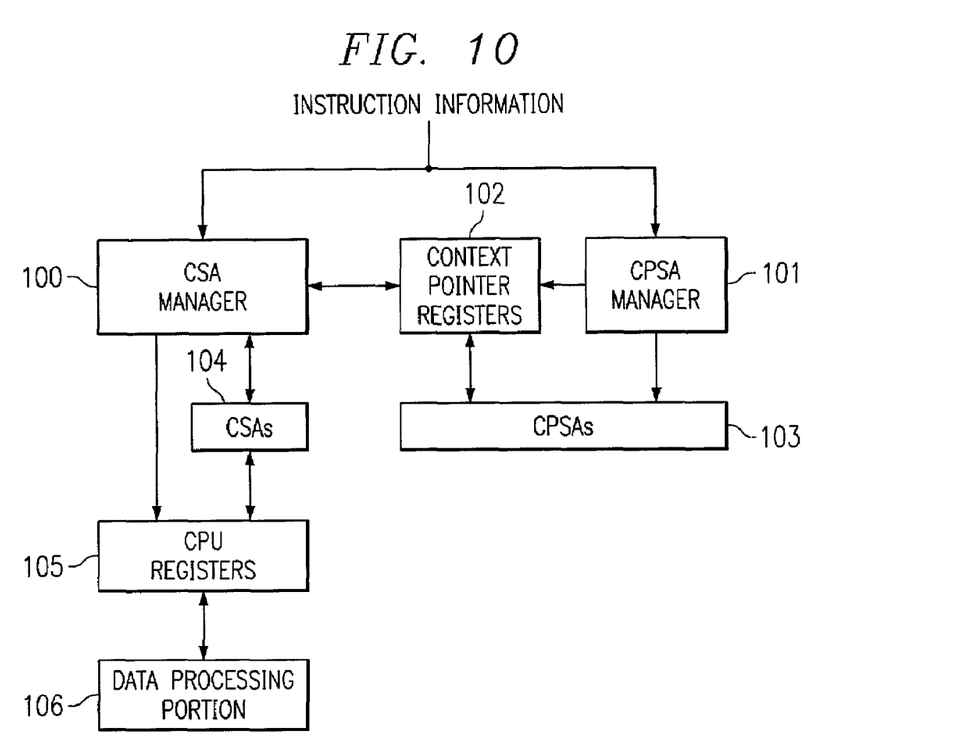
FIG. 10 diagrammatically illustrates pertinent portions of exemplary embodiments of a data processor which supports the operations illustrated in FIGS. 5A, 5B and 7-9.

FIG. 10 diagrammatically illustrates pertinent portions of exemplary embodiments of a data processor according to the invention. The data processor of FIG. 10 includes a data processing portion 106, CPU registers 105 and a task switcher portion. CPU registers 105 contain the context of a task executing on the data processing portion 106. Also included are CSAs 104 where the context information from the CPU registers 105 is saved, and from which the context information can be restored to the registers 105. The data processor of FIG. 10 also includes context pointer registers 102 (for example the aforementioned registers FCX, LCX and PCX), and CPSAs 103 where the contents of the context pointer registers can be saved and from which the context pointer registers can be loaded. The CSAs 104, CPSAs 103, context pointer registers 102 and CPU registers 105 can be allocated as desired from the data processor's memory space.

A CSA manager 100 is coupled to the CPU registers 105, the context pointer registers 102 and the CSAs 104 for managing the configuration of the CSAs 104 and further for managing context transfers (saves and restores) between the CSAs 104 and the registers 105. A CPSA manager 101 is coupled to the CPSAs 103 and the context pointer registers 102 for managing the CPSA pointer and for managing data transfers between the context pointer registers 102 and the CPSAs 103. The data processing portion 106 is coupled to the CPU registers 105 for performing data processing operations (e.g., tasks of a task switching arrangement) based on the contents of the CPU registers 105.

The CSA manager 100 is capable of performing the operations described above with respect to FIGS. 1-4. The CPSA manager 101 controls the CPSA pointer (see also FIG. 6) appropriately to achieve the desired task switching pattern. This can be accomplished, for example, using a state machine. An example of a state diagram for such a state machine is illustrated in FIG. 9. Both the CSA manager 100 and the CPSA manager 101 are operable in response to instruction information, for example a CPU instruction itself, or the output of an instruction decoder.

The data processor of FIG. 10 is capable of performing exemplary task switching operations illustrated in FIG. 8. The CSA manager 100 performs the context save operation illustrated at 81 in response to a save lower context instruction. The CSA manager 100 is also operable to save the upper context of the calling task in response to a CALL instruction. The CPSA manager 101 performs the operations at 83 and 84 in response to respective instructions to save context pointers and to update the CPSA pointer. The CPSA manager 101 is also operable to perform the operation at 85 in response to an instruction to load context pointers. The CSA manager 100 is operable for performing the operation at 87 in response to a restore lower context instruction, and the CSA manager 100 is operable to restore the upper context in response to a RET instruction corresponding to step 88 of FIG. 8.

Although exemplary embodiments of the invention are described above in detail, this does not limit the scope of the invention, which can be practiced in a variety of embodiments.

What is claimed is:

1. A method of chained switching execution of data processing tasks, comprising:
   executing a third data processing task until a task switching opportunity occurs;
   calling a task switching function with the third data processing task to store a context of the third data processing task in a register when the task switch opportunity occurs;
   executing a second data processing task until a second task switching opportunity occurs;
   calling the task switching function with the second data processing task to store the context of the second data processing task linked ahead of the context of the third data processing task in the register when the second task switching opportunity occurs:
   executing a first data processing task;
   executing a return call to the task switching function with the first data processing task;
   selecting a third return address from the register based on the return call with the task switching function while maintaining the storage of a second return address; and
   executing a return operation to the data processing task corresponding to the selected return address with the task switching function.

2. The method of claim 1, wherein said selecting step includes the task switching function selecting a first pointer that points to a first area of memory where said return address is stored.

3. The method of claim 2, wherein said pointer selecting step includes updating a second pointer to point to said first pointer.

4. The method of claim 3, wherein said updating step includes updating the second pointer from a status wherein the second pointer points to a third pointer to a status
   wherein the second pointer points to said first pointer, and wherein said third pointer points to a second area of memory.

5. The method of claim 4, wherein a return address corresponding to said first data processing task is stored in said second area of memory.

6. The method of claim 5, including the task switching function storing said third pointer.

7. The method of claim 1, including the task switching function deselecting a return address corresponding to the first data processing task.

8. The method of claim 1, including saving a return address corresponding to the first data processing task, and executing said saving step in parallel with said call executing step.

9. The method of claim 1, wherein said first data processing task is one of a host task, a disk task and a servo task of an optical drive control system, and wherein the second data processing task is another of said host task, said disk task and said servo task.

10. An apparatus for chained switching execution of tasks on a data processor, comprising:
- a memory having a first storage location for storing a return address corresponding to a second task and a second storage location for storing a return address corresponding to a third task, wherein the first storage location is linked ahead of the second storage location;
- an input for receiving information indicative of instructions of a task switching function that has been called by a first task;
- a memory management apparatus coupled to said input and said memory, and responsive to said instruction information indicating a return instruction for moving said return address from said second storage location to a register of the data processor while maintaining the first storage location in memory; and
- wherein said data processor executes a return operation to the task corresponding to the return address stored in the register of the data processor.

11. The apparatus of claim 10, wherein said memory includes a second storage location for storing a first pointer which points to a first area of said memory that includes said first storage location, said memory management apparatus responsive to said instruction information for selecting said first pointer.

12. The apparatus of claim 11, wherein said memory management apparatus includes a memory manager for maintaining a second pointer, said memory manager responsive to said instruction information for updating said second pointer to point to said first pointer in said memory.

13. The apparatus of claim 12, wherein said memory manager is operable for updating said second pointer from a status wherein said second pointer points to a third pointer stored at a third location in said memory to a status wherein said second pointer points to said first pointer, and wherein said third pointer points to a second area of said memory.

14. The apparatus of claim 13, wherein said second area of said memory includes a fourth storage location which stores therein a return address corresponding to said first data processing task.

15. The apparatus of claim 14, wherein said memory manager is responsive to said instruction information for storing said third pointer in said third location of said memory.

16. A data processing apparatus, comprising:
- a data processing portion for executing data processing tasks;
- a task switcher coupled to said data processing portion for switching from execution of a first task to execution of a second task or a third task, said task switcher including a memory having a first storage location for storing a return address corresponding to the second task, and a second, storage location for storing a return address corresponding to the third task, wherein the first storage location is linked ahead of the second storage location, and an input for receiving information indicative of instructions of a task switching function that has been called by the first task;
- a register coupled to said task switcher;
- said task switcher including a memory management apparatus coupled to said input and said memory, and responsive to said instruction information indicating a return instruction for moving said return address from said second storage location to a register of the data processing apparatus while maintaining the first storage location in memory; and
- the task switcher switching from execution of the first task to execution of the task corresponding to the return address stored in the register of the data processing apparatus.

17. The apparatus of claim 16, wherein said task switcher includes a portion of a TriCore data processor architecture.

18. The apparatus of claim 16, wherein said register is a program counter register.

19. The apparatus of claim 16, wherein said first data processing task is one of a host task, a disk task and a servo task of an optical drive control system, and wherein the second data processing task is another of said host task, said disk task and said servo task.

* * * * *